United States Patent [15] 3,669,889
Juzvuk et al. [45] June 13, 1972

[54] GRANULAR CERAMIC HEAT CARRIER AND METHOD FOR MANUFACTURE THEREOF

[72] Inventors: Diomid Ilich Juzvuk, Sverdlovskoi oblasti, ul. Gagarina 4, kv. 4; Valentin Vasilievich Saparov, Sverdlovskoi oblasti, ul. Gagarina, 4, kv. 2, both of Bogdanovich Sverdlovskoi oblast, U.S.S.R.

[22] Filed: Dec. 20, 1968

[21] Appl. No.: 785,764

[52] U.S. Cl. ................................. 252/71, 106/59, 106/65, 106/66, 106/67, 106/68, 252/455 R
[51] Int. Cl. ................................. C04b 35/10, C09k 3/02
[58] Field of Search .......................... 252/71, 455 R; 106/65–68, 59

[56] References Cited

UNITED STATES PATENTS

| | | | |
|---|---|---|---|
| 2,272,038 | 2/1942 | Morgan | 106/66 |
| 2,672,671 | 3/1954 | Robinson | 252/71 |
| 2,685,528 | 8/1954 | Robinson | 106/65 |
| 3,184,321 | 5/1965 | Heuer et al. | 106/66 X |
| 3,403,213 | 9/1968 | Taylor et al. | 106/59 X |
| 3,442,668 | 5/1969 | Fenerty et al. | 106/65 X |
| 3,473,938 | 10/1969 | Oberlin | 106/65 X |

OTHER PUBLICATIONS

"Condensed Chemical Dictionary" pg. 419 7th ed. (1966)

Primary Examiner—Richard D. Lovering
Attorney—Waters, Roditi, Schwartz & Nissen

[57] ABSTRACT

A granular ceramic heat carrier for use in conjunction with chemical processes, the granules of which heat carrier contain the oxides of aluminum, silicon, chromium and iron, and a method of manufacturing said granular ceramic heat carrier comprising preparing a mix from alumina, fire clay and chrome are powders and a binder.

10 Claims, No Drawings

GRANULAR CERAMIC HEAT CARRIER AND METHOD FOR MANUFACTURE THEREOF

This invention relates to granular ceramic heat carriers to be used in chemical processes and to methods of manufacturing the same.

The aforesaid heat carrier may find application for the pyrolysis of hydrocarbons with a view to producing ethylene, propylene and acetylene, for the production of inert gases to be used for heat treatment of metal elements and structures, for the manufacture of fuel gases by the contact pyrolysis of petroleum products and tars, and also in the synthetic rubber industry as a promoting additive in catalyst systems, etc.

Known in the art is a granular ceramic heat carrier intended for use in chemical processes and characterized in that the granules of the heat carrier contain alumina and silica; also known is a method of manufacturing this granular heat carrier from powdered alumina and fire clay in the presence of a binder.

The known granular ceramic heat carrier is devoid of adequate mechanical strength and wear resistance, which disadvantages make the consumption rate of this material excessively high.

The known granular ceramic heat carrier suffers from a further limitation of exhibiting low heat resistance.

It is an object of the present invention to obviate the aforementioned limitations.

It is a further and more specific object of the invention to provide a granular ceramic heat carrier having granules of any desired size and exhibiting high mechanical strength, wear resistance and thermal stability.

This object is accomplished by the provision of a granular ceramic heat carrier whose granules, apart from silica and alumina, contain, according to the invention, also chromium and iron oxides.

It is expedient to employ a granular ceramic heat carrier containing 75–80 percent of alumina, 5–7 percent of silica, 5–10 percent of chromium oxides and 2–3 percent of iron oxides by the weight of the heat carrier.

The present granular ceramic heat carrier can be conveniently prepared by a method which comprises blending powdered alumina, fire clay and chrome ore with a binder, the preferred amounts of the pulverant components being as follows:
65–75 percent of alumina, 10–15 percent of fire clay, and 15–20 percent of chrome ore based on the overall weight of the blend.

To prepare a granular heat carrier noted for its enhanced heat conductivity, mechanical strength and wear resistance, it is good practice to employ a solution of sodium silicate or potassium silicate, or a mixture thereof.

Where it is desired to obtain a granular heat carrier having granules of any pre-set size and exhibiting superior mechanical strength and wear resistance characteristics, recourse should be had to a solution of aluminum sulfate and sulfite-cellulose liquor as the binder. In the latter case, the procedure comprises preparing a mixture of pulverant alumina, fire clay and chrome ore, taking about one-third of the resultant mixture and moistening it with an aluminum sulfate solution and subjecting it to granulation while feeding simultaneously to the granulation step the remaining two-thirds of the dry mixture and moistening the thus obtained granules with sulfite-cellulose liquor.

The present method for the manufacture of granular ceramic heat carrier is accomplished in the following manner.

Into a ball mill are charged and mixed for a period of about 2 hours powdered components taken in the following amounts, percent by weight: alumina (grain size, below 0.1 mm); 65–75; fire clay (grain size, below 0.5 mm), 10–15; and chrome ore (grain size, below 0.1 mm), 15–20.

The resultant dry mix is transferred into a mixer, in which it is stirred for 15 minutes while being moistened, for example, with a solution of aluminum sulfate (sp.gr. 1.22 g/cm³), or a mixture of sulfite-cellulose liquor (sp. gr. 1.22–1.24 g/cm³) and an aluminum sulfate solution (sp. gr. 1.20–1.22), or a solution of sodium silicate (sp. gr. 1.30–1.35 g/cm³), or a solution of potassium silicate (sp. gr. 1.30–1.35 g/cm³), or a mixture of sodium and potassium silicate solutions (sp. gr. 1.30–1.35 g/cm³).

The next step consists in discharging the moistened mix (moisture content, about 8–10 percent) from the mixer and triturating through a sieve having 1 mm openings until there is obtained a homogeneous mass which is thereafter directed to a collector. From the collector, the mix is fed every 2–3 minutes in 2–3 kg portions to a granulator, in which granulating the mix is effected while moistening (spraying) the resultant granules with one of the aforementioned solutions having a specific gravity of 1.12–1.19 g/cm³. The spherical granules thus obtained are discharged from the granulator, graded through appropriate screens and thereafter subjected to secondary granulation for a period of 5–10 minutes until they acquire regular spherical shape.

The secondary granulation step having been terminated, the granules are dried at a temperature of 100–120° C and thereafter fired by gradually raising the temperature to ca.1,500°–1,650° C over a period of 24–36 hours, followed by maintaining said temperature for an additional period of 6–10 hours.

After firing and cooling, the resultant spherical granules from 3 to 30 mm in dia. comprise the finished heat carrier.

In order to increase the yield of granulated ceramic heat carrier having the pre-set diameter of granules and exhibiting improved performance characteristics, the present method may be accomplished in accordance with the following flow sheet.

In a ball mill there are mixed for a period of about 2 hours powdered alumina, fire clay and chrome ore taken in the proportions and having grain sizes specified hereinabove. Approximately two-thirds of the mix thus obtained is transferred into a collector, whereas the remaining mix (about one-third of the total amount) is discharged into a mixer, where it is moistened, while being stirred for a period of 15 minutes, with a solution of aluminum sulfate (sp.gr. 1.20–1.22 g/cm³), or a solution of sodium silicate (sp.gr. 1.30–1.35), or a mixture of sodium and potassium silicate solutions (sp. gr. 1.30–1.35 g/cm³).

The resultant moistened mix having a moisture content of ca. 10–16 percent is subjected to trituration through a sieve and fed in 2–3 kg batches every 10 minutes to a granulator. The granulation step is carried out while feeding from the collector the dry mix in 0.5–1 kg batches every 2–3 minutes and moistening (spraying) the resultant granules with sulfite-cellulose liquor (sp.gr. 1.12–1.19 g/cm³), or a solution of sodium silicate (sp.gr. 1.12–1.19 g/cm³), or a solution of potassium silicate (sp.gr., 1.12–1.19 g/cm³), or a mixture of sodium and potassium silicate solutions (sp.gr. 1.12–1.19 g/cm³).

Secondary granulation, drying, firing and cooling of the granules are carried out as disclosed hereinabove. The finished ceramic heat carrier granules are spherical in shape and may have a diameter of from 0.5 to 20 mm.

For a better understanding of the present invention, the following examples of manufacturing the spherical ceramic heat carrier granules are given by way of illustration.

EXAMPLE 1

In a ball mill containing 240 kg of steel balls 25 mm in dia. there are mixed for a period of 2 hours 84 kg of alumina powder, 12 kg of fire clay powder, and 24 kg of chrome ore powder.

80 kg of the thus prepared mix is transferred to a collector, while the remaining mix is placed in a mixer and stirred for 15 minutes while moistening the mix with 6 lit of an aluminum sulfate solution (sp.gr. 1.20 g/cm³). The moistened mix is discharged from the mixer and triturated through a sieve having 1 mm opening until there is obtained a homogeneous mass which is transferred to a separate collector. From the collector the moistened mix is fed in batches of 3 kg every 10–12 minutes into a granulator having a bowl 1 m in diameter, provision being made for feeding simultaneously into the granulator 1 kg batches of the dry mix every 2 minutes and for moistening the thus obtained granules with sulfite-cellulose liquor (sp.gr. 1.15 g/cm³).

The resultant spherical granules from 4 to 9 mm in dia. are graded on screens having 4.5 and 8 mm openings. The granules having a diameter smaller than 4.5 mm and greater than 8 mm are triturated on a sieve having 1 mm openings and the mass thus obtained is recycled back to the granulation step.

The granules having a diameter in the 5 to 8 mm range are subjected to secondary granulation with a view to imparting regular spherical shape thereto, followed by drying the granules at a temperature of 120° C and firing the dried granules by gradually raising the temperature to 1,650° C over a period of 36 hours and maintaining the granules at this temperature for 8 hours, and thereafter cooling the fired granules.

The thus obtained spherical ceramic heat carrier has the following analysis, percent by weight:

| | | | |
|---|---|---|---|
| $Al_2O_3$ | 79; | $Fe_2O_3$ | 3 |
| $Cr_2O_3$ | 9 | CaO and MgO | 2.5 |
| $SiO_2$ | 6.5 | | |

Presented below are the essential characteristics of the spherical ceramic heat carrier:

| | |
|---|---|
| diameter of spheres | from 4.5 to 7.5 mm |
| compression strength | from 500 to 700 kg/cm² |
| porosity | 28–32% |
| refractoriness | ca. 2,000° C |
| weight loss of spherical heat carrier after a dwell time of 15 minutes in an air-lift pump | 1.5 to 2% |

The spherical heat carrier prepared as described hereinabove can be used in chemical processes at a temperature of up to 1,400° C.

EXAMPLE 2.

In the ball mill of Example 1 there are charged and mixed for a period of 2 hours 84 kg of alumina powder, 12 kg of fire clay powder and 24 kg of chrome ore powder.

80 kg of the thus prepared mix is transferred to a collector, while the rest of the mix is charged in a mixer and stirred for 15 minutes while moistening the contents of the mixer with 4 lit of a sodium silicate solution (sp.gr. 1.30 g/cm³). The moistened mix is discharged from the mixer and subjected to trituration through a sieve having 1 mm openings until there is obtained a homogeneous mass which is delivered to a separate collector. From the collector, the moistened mix is fed in 3 kg batches every 10–12 minutes to a granulator having a bowl 1 m in dia., the dry mix from the other collector being simultaneously fed into the granulator in 1 kg batches every 2 minutes and provision being made for moistening the thus prepared granules with a sodium silicate solution (sp.gr. 1.12 g/cm³).

The resultant spherical granules from 4 to 9 mm in dia. are graded on screens having 4.5 and 8 mm openings. The granules less than 4.5 mm and greater than 8 mm in dia. are triturated through a sieve having 1 mm openings and the mass thus obtained is recycled back to the granulation step.

The granules from 5 to 8 mm in dia. are subjected to secondary granulation with a view to imparting regular spherical shape thereto, followed by drying the granules at a temperature of 120° C and firing the dried granules by gradually raising the temperature to 1,500° C over a period of 24 hours and maintaining the granules at this temperature for 8 hours, and thereafter cooling the fired granules.

The thus obtained ceramic heat carrier in the form of spheres has the following analysis, percent by weight:

| | | | |
|---|---|---|---|
| $Al_2O_3$ | 78 | $Fe_2O_3$ | 3 |
| $Cr_2O_3$ | 9 | $Na_2O$ | 1 |
| $SiO_2$ | 7 | CaO and MgO | 2 |

Presented below are the essential characteristics of the spherical ceramic heat carrier:

| | |
|---|---|
| diameter of spheres | from 4.5 to 7.5 mm |
| compression strength | from 800 to 1,000 kg/cm² |
| porosity | 28–32% |
| refractoriness | ca. 1,800° C |
| weight loss of spherical heat carrier after a dwell time of 15 minutes in an air-lift pump | 0.2–1% |

The spherical heat carrier prepared as described hereinabove lends itself to employment in conjunction with chemical processes involving temperatures of up to 1,200° C.

Although the present invention has been described with reference to the preferred embodiment thereof, it will be readily appreciated by those skilled in the art that various changes and modifications may be resorted to without deviating from the spirit and scope of the invention as disclosed in appended claims.

We claim:

1. A granular ceramic heat carrier which consists essentially of 75–80 percent alumina, 5–7 percent silica, 5–10 percent chromium oxides and 2–3 percent iron oxides based on the overall weight of said heat carrier and which has a grain size of 4.5 to 7.5 mm, a porosity of 28 to 32 percent and a compression strength of 500 to 1,000 kg/cm².

2. A method for the manufacture of a granular ceramic heat carrier which comprises the steps of (1) preparing a dry mix from 65–75 percent powdered alumina, 10–15 percent fire clay, and 15–20 percent chrome ore based on the overall weight of the dry mix, (2) moistening the dry mix with a first portion of a binder selected from the group consisting of aqueous aluminum sulfate, cellulose sulfite liquor and an alkali metal silicate selected from sodium silicate, potassium silicate and mixtures of the two, said first portion of said binder having a specific gravity of 1.20–1.35 (3) granulating said moistened mix while moistening with a second portion of said binder having a specific gravity of 1.12–1.19 and (4) subjecting the resultant granules to firing by heating to a temperature of 1,500°–1,650° C. over a period of 24–36 hours and holding at that temperature for 6–10 hours.

3. A method according to claim 2, wherein the binder is a sodium silicate solution.

4. A method according to claim 2, wherein the binder is a potassium silicate solution.

5. A method according to claim 2, wherein the binder is a mixture of sodium and potassium silicate solutions.

6. A method according to claim 2, wherein about one-third of the dry mix is moistened with an aluminum sulfate solution and subjected to granulation while feeding simultaneously to the granulator the remaining two-thirds of the dry mix and the moistening the resultant granules with sulfite-cellulose liquor.

7. A method as in claim 6 wherein the aluminum sulfate solution has a specific gravity of 1.20 to 1.22g/cm³ and the sulfite-cellulose liquor has a specific gravity of 1.12 to 1.19g/cm³.

8. A method as in claim 7 wherein the firing is carried out at 1,650° C. for 8 hours.

9. A method as in claim 2 wherein step (2) comprises moistening one-third of the dry mix with a first alkali metal silicate solution binder having a specific gravity of 1.30 to 1.35 g/cm³ to obtain a moisture content of 8 to 10 wt. percent, granulating the resultant mix, spraying the granules with a second alkali metal silicate solution binder having a specific gravity of 1.12 to 1.19 g/cm³ while simultaneously adding the remaining two-thirds of the dry mix.

10. A method as in claim 9 wherein the firing is carried out at 1,500°C. for 8 hours.

* * * * *